Patented Sept. 21, 1937

2,093,778

UNITED STATES PATENT OFFICE 2,093,778

HYDROXY-HALOGENATED ARYL COMPOSITIONS

Lucas P. Kyrides, Webster Groves, Mo., assignor, by mesne assignments, to Monsanto Chemical Company, a corporation of Delaware No Drawing. Application March 13, 1933, Serial No. 660,524

6 Claims. (Cl. 260—154)

This invention relates to a novel class of phenol compositions characterized in that they contain at least one halogen atom, at least one free hydroxyl group, and an aliphatic radical joined to the benzene nucleus directly or by means of an oxygen atom, said aliphatic radical being of a forked chain type and having at least four carbon atoms. The present application is a continuation-in-part of my co-pending application Serial Number 600,380, filed March 21, 1932. Attention is drawn to my copending application Serial Number 727,881, Alkyl phenol and method of manufacturing the same, wherein tertiary halogenated resorcinols are disclosed and specifically claimed.

This invention contemplates a novel class of halogenated phenolic compositions having inordinate bactericidal, germicidal, as well as general disinfecting properties, and at the same time having a solubility which in many cases is greater than that afforded by compounds proposed heretofore.

The present invention contemplates phenolic compositions which may be represented in their essentials by the following formula:

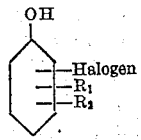

where, in the case of alkyl and acyl derivatives, $R_1$ is a hydroxyl group and $R_2$ is an alkyl or acyl group having more than four carbon atoms and not more than twelve carbon atoms arranged in a forked chain configuration; or where, in the case of the ether derivatives, $R_1$ is a hydrogen atom and $R_2$ is an alkyloxy group having more than four carbon atoms and not more than twelve carbon atoms, the carbon atoms being arranged in a forked chain configuration.

The inordinate efficacy of this class of compounds is exemplified by the fact that beta-ethyl-hexyl-chloro-resorcinol has a phenol coefficient of 1000 as measured by the Reddish method. The corresponding bromo-resorcinol, tested under the same conditions and on the same strain of Staphylococcus aureus, evidences a phenol coefficient of 1300.

In general, compositions contemplated by the present invention having a relatively large number of carbon atoms in the aliphatic chain are more effective against Staphylococcus aureus, whereas those having relatively fewer carbon atoms in the aliphatic chain are more effective against bacillus-typhosus. Under the circumstances, it is advantageous to employ mixtures of the materials where general disinfection is sought.

The compositions contemplated by the present invention are made conveniently by reacting a forked chain aliphatic acid, having more than four and not more than twelve carbon atoms, or its acid chloride with resorcinol in the presence of zinc chloride whereby the corresponding acyl resorcinol is formed which subsequently is reduced by the Clemmensen method (using hydrochloric acid and amalgamated zinc) to form the alkyl derivative. The alkylation may, of course, be effected by other means or methods if desired. The alkyl derivative is finally halogenated by suitable halogenating agents such as elemental chlorine, elemental bromine or other suitable halogenating agents.

In general, these compositions may be employed in a manner analogous to that employed in connection with corresponding non-halogenated aliphatic derivatives of phenols in mouthwashes, toothpastes, moth, fungus or mould preventative preparations as well as in general disinfectants for internal or external use. Various solvents, such as aqueous glycerol, glycol, ethyl alcohol, etc., may be employed either alone or in admixture with each other. Obviously, other ingredients may be added, depending upon the specific intended use to be made of the final product. These may include water soluble soaps or wetting agents, flavors, coloring matter, as well as other antiseptic compositions.

The following examples will serve to illustrate a method of preparing products embodying the principles of my invention.

*Example I.*—Beta-ethyl-hexyl-chloro-resorcinol. This product is prepared by adding slowly and with agitation, 45 parts resorcinol to a solution consisting of 65 parts of zinc chloride dissolved in 150 parts of alpha-ethyl-hexoic acid having the formula:

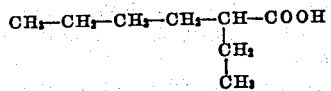

while maintaining a temperature of 125°–135° C. After three hours the reacted mixture is diluted with water and the resulting two layers are separated. The non-aqueous layer, which contains the acyl product, is purified by distillation preferably in vacuo, the yield being approximately 91 parts by weight of the ketone. It boils at about 186° C. at 8 mm. pressure and gives a deep red coloration in ferric chloride solution.

The ketone thus obtained is reduced conveniently by the Clemmensen method which consists in subjecting the ketone to the action of amalgamated zinc and dilute hydrochloric acid. The reduction proceeds smoothly at the boiling temperature of the mixture. The product may be purified by crystallization from petroleum ether.

Chlorination is effected conveniently by adding a molar equivalent of sulfuryl chloride to the alkyl resorcinol which previously has been dissolved in an inert solvent such as acetic acid or carbon tetrachloride. The mono-halogenated product may be crystallized from petroleum ether containing a small amount of water whereby a hydrated form having a melting point of 56° C. is obtained. The phenol coefficient of the anhydrous product on *Staphylococcus aureus* is about 1000.

*Example II*.—Beta-ethyl-hexyl-bromo-resorcinol. This product is made by adding bromine dissolved in acetic acid, slowly, to beta-ethyl-hexyl-resorcinol likewise dissolved in acetic acid. The melting point of the anhydrous product which is obtained by recrystallization from petroleum ether and followed by careful drying in vacuo is 62° C. Its phenol coefficient is even greater than that of the corresponding chloro derivative.

*Example III*.—Di-ethyl-ethyl-chloro-resorcinol. This product may be made conveniently from di-ethyl-acetic acid or its acid chloride following in general the procedure hereinabove described. The ketone is obtained by adding the acid chloride slowly to resorcinol which is maintained at about 120° C. Hydrogen chloride is evolved. After the theoretical amount of the acid chloride has been added a small amount of anhydrous zinc chloride is introduced and the reaction mixture is maintained at about 98°–100° C. for approximately three hours. The ketone is recovered in the usual manner by washing with water and distilling, preferably in vacuo.

The reduction of the ketone to form the alkyl derivative is effected in the usual manner. By subjecting the product to fractional distillation and crystallization from petroleum ether a product is obtained which boils at 182° C. at 11 mm. and melts at 73° C. It is chlorinated conveniently by means of sulfuryl chloride in the presence of a solvent such as carbon tetrachloride. Crystallization of the chlorinated product from petroleum ether containing a small amount of water results in a product having a melting point of 59° C. The anhydrous product melts at about 35° C.

*Example IV*.—Beta-ethyl-hexyl-iodo-resorcinol may be made by mixing a molar proportion of beta-ethyl-hexyl-resorcinol, which is dissolved in a solvent such as ether, with approximately a molar equivalent of iodine, preferably likewise dissolved in ether. To the mixture there is added slowly an excess (3 to 5 mol. equivalents) of litharge, the solution being agitated vigorously during the addition and until the color of the iodine disappears.

In general the forked chain alkyl halogenated derivatives appear to be more soluble in dilute alcoholic solvents than the normal chain halogenated derivatives and from this standpoint are preferable to the normal alkyl derivatives for certain purposes. Thus, di-ethyl-ethyl-chloro-resorcinol (melting point anhydrous: 35° C. hydrated form: 59° C.) having the formula

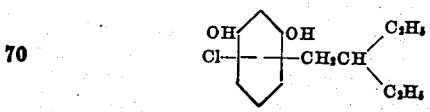

is nearly half again as soluble in 10% aqueous alcohol as normal hexyl-chloro-resorcinol. Similarly, beta-ethyl-hexyl-chloro-resorcinol, having the formula:

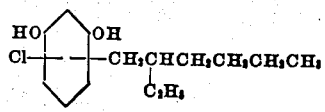

(obtained from alpha-ethyl-hexoic acid) is practically three times as soluble in aqueous alcoholic solvents as normal octyl-chloro-resorcinol. A similar solubility relationship exists between the corresponding bromo and iodo derivatives. Other forked chain compounds contemplated by the present invention include pentyl halogenated resorcinol (methyl-2-resorcinol-1-butane) having the formula:

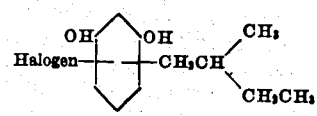

heptyl halogenated resorcinol (ethyl-2-resorcinol-1-pentane) having the formula:

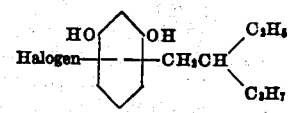

and, nonyl halogenated resorcinol (propyl-2-resorcinol-1-hexane) having the formula:

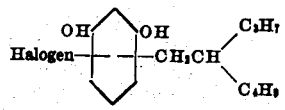

These products possess a common high germicidal power and low toxicity and are suitable for the purposes herein set forth. It will be apparent from the foregoing description that the present invention affords a novel class of compositions which possess strong germicidal properties and may thereafter be employed in very small amounts without defeating the purpose for which they are intended. While representative examples of the application of the principles of the invention have been set forth, these are illustrative only, since the invention is susceptible to many variations without departing from the scope thereof. Thus, corresponding poly halogenated nuclear substituted products are contemplated as well as products wherein there are joined to the benzene nucleus additional organic substituent groups, to wit: and alkyl group, an aralkyl group which group may contain a nuclear substituted halogen, an example of which is para-chloro-benzyl $C_6H_4ClCH_2$—, a cyclohexyl group, a hydroxyl or an alkyl ether group.

What I claim is:
1. A halogenated dihydroxy benzene composition embodying the aliphatic group-$CH_2R$, said group being joined to a carbon atom of the benzene ring, R being a secondary alkyl radical containing more than three and not more than eleven carbon atoms.
2. A halogenated resorcinol composition embodying the aliphatic group-$CH_2R$, said group being joined to a carbon atom of the benzene ring, R being a secondary alkyl radical containing more than three and not more than eleven carbon atoms.
3. A halogenated beta-ethyl-hexyl-resorcinol.
4. Beta-ethyl-hexyl-chloro-resorcinol.
5. Beta-ethyl-hexyl-bromo-resorcinol.
6. A halogenated phenolic composition charac- terized by its inordinate germicidal properties which may be represented structurally:
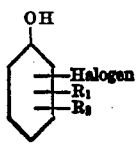
where $R_1$ is a hydroxyl group and $R_2$ is the alkyl group $-CH_2R$ joined to the carbon atom of the ring, R being a secondary alkyl radical containing more than three and not more than eleven carbon atoms.
LUCAS P. KYRIDES.